(12) United States Patent
Cheng et al.

(10) Patent No.: US 8,358,113 B2
(45) Date of Patent: Jan. 22, 2013

(54) CURRENT BALANCE IN A MULTI-PHASE POWER CONVERTER WITH CONSTANT ON-TIME CONTROL

(75) Inventors: Chung-Sheng Cheng, Jhubei (TW); Chung-Shu Li, Yonghe (TW); Chia-Jung Lee, Hsinchu (TW); Jian-Rong Huang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 656 days.

(21) Appl. No.: 12/461,182

(22) Filed: Aug. 4, 2009

(65) Prior Publication Data

US 2010/0033154 A1 Feb. 11, 2010

(30) Foreign Application Priority Data

Aug. 7, 2008 (TW) .............................. 97130145 A

(51) Int. Cl.
*G05F 1/00* (2006.01)
*G05F 3/04* (2006.01)
*G05F 3/08* (2006.01)

(52) U.S. Cl. ...................................... 323/272; 323/312

(58) Field of Classification Search ................... 323/242, 323/243, 272, 312
See application file for complete search history.

(56) References Cited

U.S. PATENT DOCUMENTS

| 6,278,263 | B1 * | 8/2001 | Walters et al. ................. 323/272 |
| 6,414,470 | B1 * | 7/2002 | Liu et al. ........................ 323/272 |
| 2002/0125869 | A1 * | 9/2002 | Groom et al. ................. 323/283 |
| 2003/0201761 | A1 * | 10/2003 | Harris ........................... 323/272 |
| 2003/0218496 | A1 * | 11/2003 | Mori .............................. 327/538 |
| 2008/0197824 | A1 * | 8/2008 | Qiu et al. ....................... 323/272 |

\* cited by examiner

*Primary Examiner* — Adolf Berhane
*Assistant Examiner* — Gary Nash
(74) *Attorney, Agent, or Firm* — Muncy, Geissler, Old s& Lowe, PLLC

(57) ABSTRACT

A multi-phase power converter with constant on-time control includes a plurality of channels to convert an input voltage into an output voltage, and each of the channels is driven by a control signal. When all channel currents of the channels are balanced, each of the control signals remains a constant on-time. When the channel currents are imbalanced, the on-times of the control signals are modulated according to the difference between each channel current and a target value for current balance between the channels.

17 Claims, 12 Drawing Sheets

CURRENT BALANCE IN A MULTI-PHASE POWER CONVERTER WITH CONSTANT ON-TIME CONTROL

FIELD OF THE INVENTION

The present invention is related generally to power converters and, more particularly, to current balance control for a multi-phase power converter with constant on-time control.

BACKGROUND OF THE INVENTION

A multi-phase power converter includes a plurality of signal-phase switching regulators connected in parallel to a common output, each of the signal-phase switching regulators being regarded as a channel of the multi-phase power converter. For thermal balancing in a multi-phase power converter, the currents in each channel should be equal to each other and therefore, a current balance mechanism is necessary for implementing balanced currents between the channels. Generally, switching power converters employ pulse width modulation (PWM) control with constant or variable switching frequencies. FIG. 1 is a diagram showing the constant switching frequency PWM control, in which the signal PWM1 for driving a channel of a multi-phase power converter has a constant switching period Tsw, and by changing the on time Ton or the off time Toff of the signal PWM1, the duty ratio of the signal PWM1 is modulated to regulate the output voltage and the output current of the channel. FIG. 2 is a diagram showing the variable switching frequency PWM control, in which the signal PWM2 for driving a channel of a multi-phase power converter has a constant on time Ton, and by changing the switching period Tsw of the signal PWM2, the duty ratio of the signal PWM2 is modulated to regulate the output voltage and the output current of the channel.

FIG. 3 is a simplified circuit diagram of a conventional two-phase power converter 10 which includes channels 12 and 16. In the channel 12, a switching circuit 14 generates a channel current I1 according to a control signal S1, and in the channel 16, a switching circuit 18 generates a channel current I2 according to a control signal S2. In the two-phase power converter 10, the reason causing the channel currents I1 and I2 unbalanced includes mismatched impedances R1 and R2 of the channels 12 and 16 to each other. Assuming that the two-phase power converter 10 employs constant on time control and only an output voltage feedback loop, both the channels 12 and 16 will have a same switching period. In other words, both the channels 12 and 16 will have a same duty ratio. Without any current balance mechanism, the two-phase power converter 10 will enter a state having balanced voltages V1 and V2 and imbalance currents I1 and I2 due to the mismatched impedances R1 and R2.

Therefore, it is desired a current balance mechanism for multi-phase power converters with constant on-time control.

SUMMARY OF THE INVENTION

An object of the present invention is to implement current balance in a multi-phase power converter with constant on-time control.

According to the present invention, a multi-phase power converter with constant on-time control includes a plurality of channels to convert an input voltage into an output voltage, and each of the channels is driven by a control signal. For a selected channel, an apparatus is provided to detect the difference between the channel current and a target value to thereby generate a current error signal therefrom for the selected channel, and determine an on time according to the current error signal for the control signal. When all the channel currents are balanced, the control signal remains a constant on-time. When the channel currents are imbalanced, the on-time of the control signal is modulated according to the current error signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
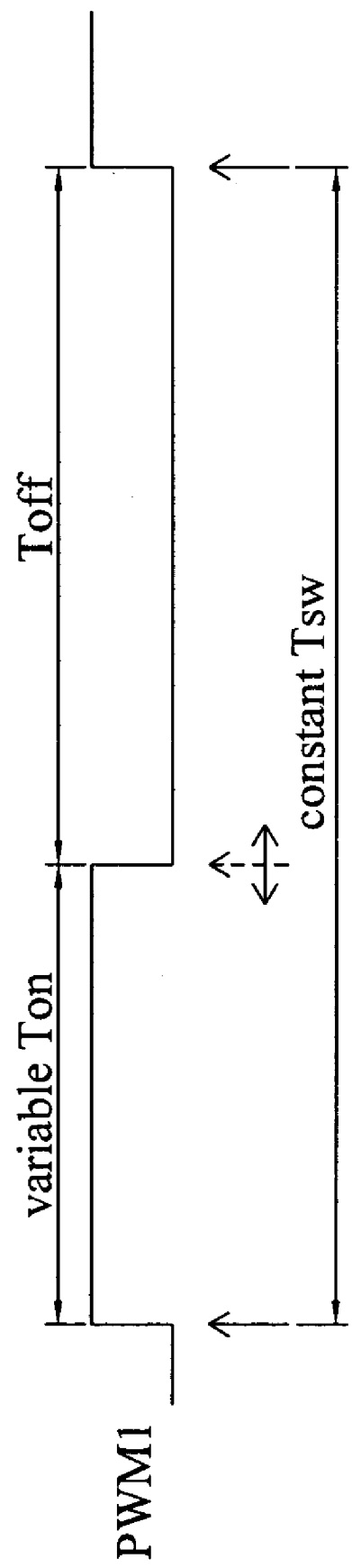
FIG. 1 is a diagram showing a constant switching frequency PWM control.
Figure 2:
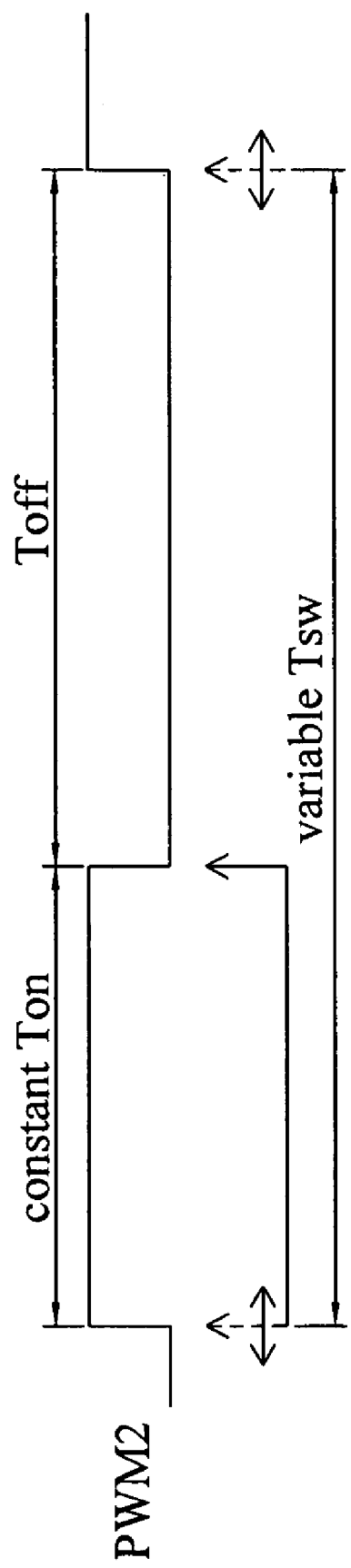
FIG. 2 is a diagram showing a variable switching frequency PWM control.
Figure 3:
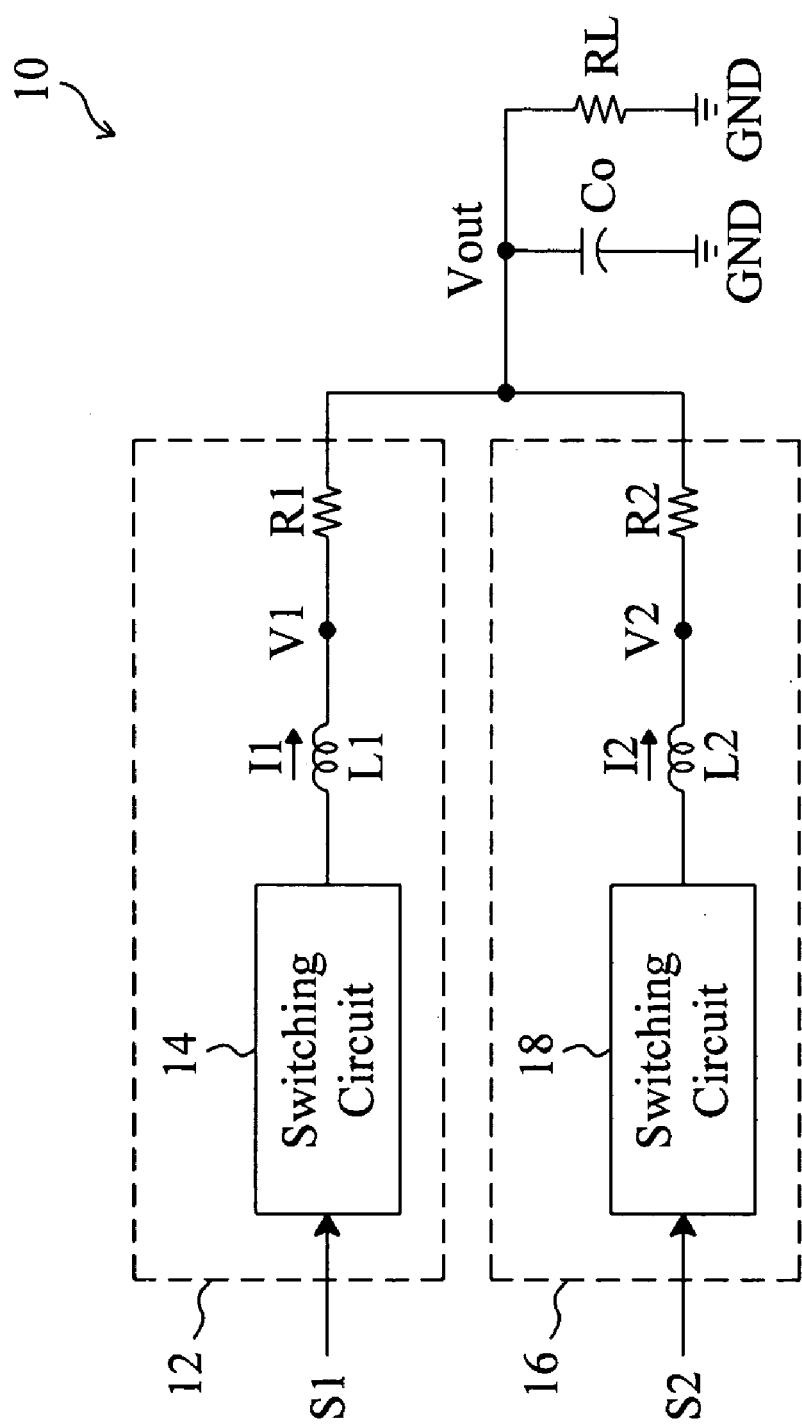
FIG. 3 is a simplified circuit diagram of a conventional two-phase power converter.
Figure 4:
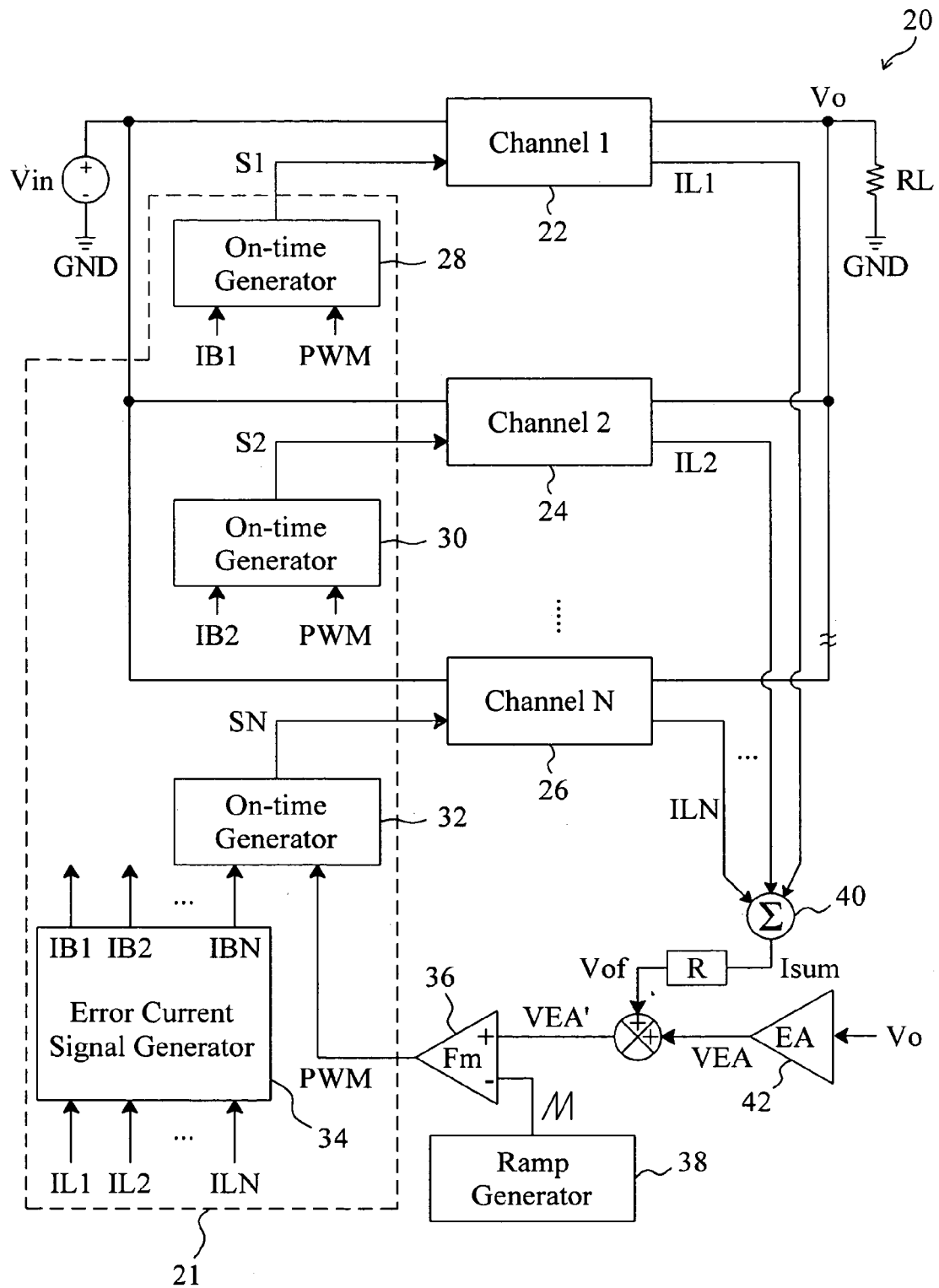
FIG. 4 is a circuit diagram of a multi-phase power converter according to the present invention.

In an embodiment according to the present invention as shown in FIG. 4, a multi-phase power converter 20 includes N channels, where N is a natural number equal to or greater than two, and the N channels 22, 24 and 26 convert an input voltage Vin into an output voltage Vo according to N control signals S1, S2 and SN provided by N on-time generators 28, 30 and 32, respectively. An error amplifier 42 generates an error signal VEA according to the difference between the output voltage Vo and a reference voltage (not shown in FIG. 1). An adder 40 combines all channel currents IL1, IL2 and ILN of the channels 22, 24 and 26 to generate a summed current Isum, and the summed current Isum flows through a resistor R to generate an offset signal Vof to offset the error signal VEA, so as to produce an error signal VEA'. A comparator 36 compares the error signal VEA' with a ramp signal provided by a ramp generator 38 to generate a signal PWM. A current balance apparatus 21 includes an error current signal generator 34 and N on-time generators 28, 30 and 32. The error current signal generator 34 detects the differences between each of the channel currents IL1, IL2 and ILN and a target value to generate N current error signals IB1, IB2 and IBN for the N on-time generators 28, 30 and 32. The on-time generators 28, 30 and 32 determine respectively the N control signals S1, S2 and SN according to the N current error signals IB1, IB2 and IBN and the signal PWM. When all the channel currents IL1, IL2 and ILN are balanced, the on-times of the control signals S1, S2 and SN will remain constant. On the other hand, when the channel currents IL1, IL2 and ILN are imbalanced, the on-time generators 28, 30 and 32 will modulate the on-times of the control signals S1, S2 and SN according to the current error signals IB1, IB2 and IBN.

Figure 5:
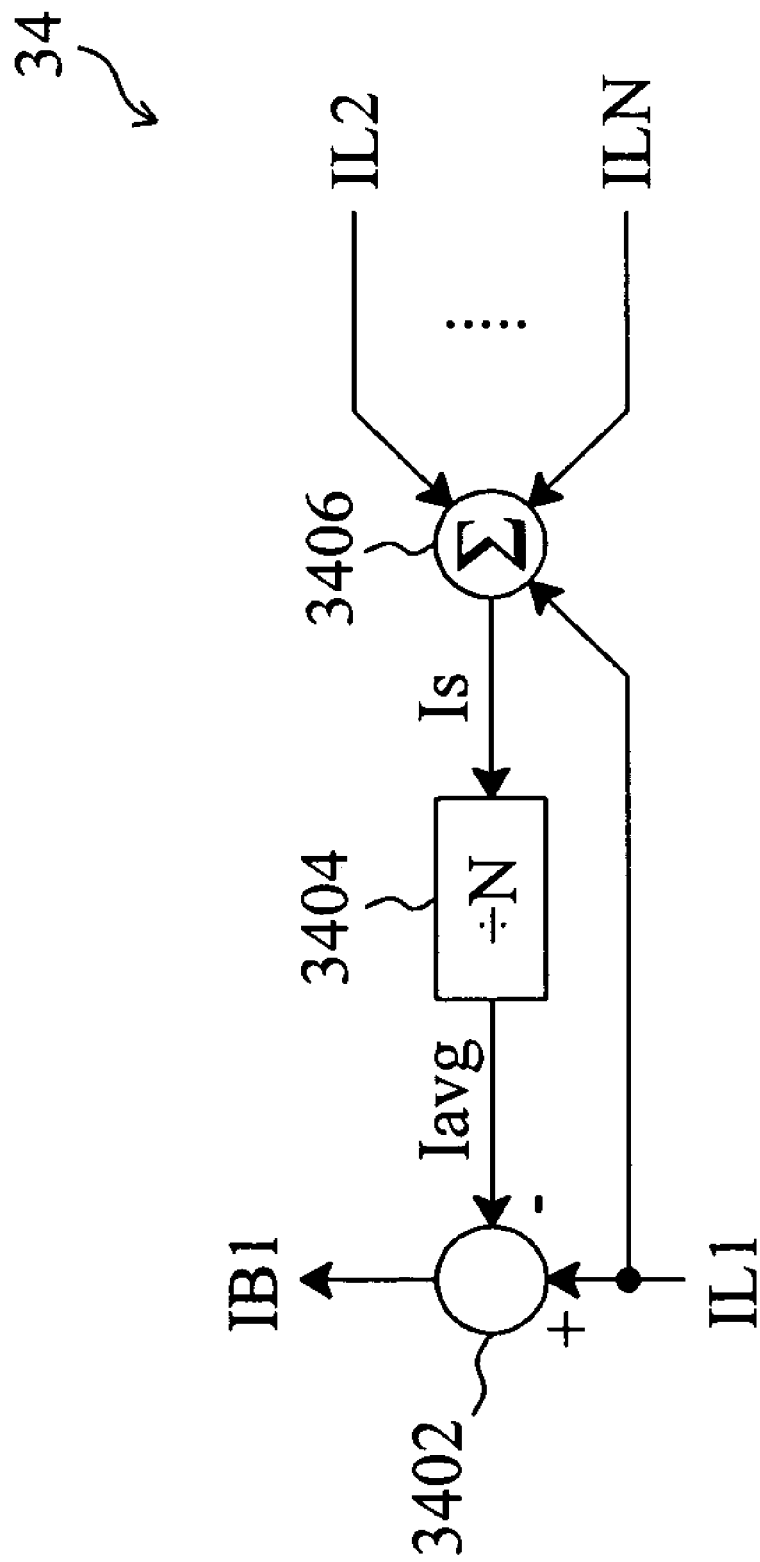
FIG. 5 is a circuit diagram of an embodiment for the error current signal generator shown in FIG. 4.

FIG. 5 is a circuit diagram of an embodiment for the error current signal generator 34, in which an adder 3406 combines all the channel currents IL1, IL2 and ILN to generate a summed current Is, a divider 3404 divides the summed current Is by the number N of the channels to generate an average current Iavg as the target value, and a subtractor 3402 subtracts the average current Iavg from the channel current IL1 of the channel 22 to generate the current error signal IB1 for the channel 22. Although this embodiment only shows the generation of the current error signal IB1 for the channel 22, those skilled in the art would readily appreciate that the other current error signals IB2 to IBN can be generated in the same manner.

Figure 6:
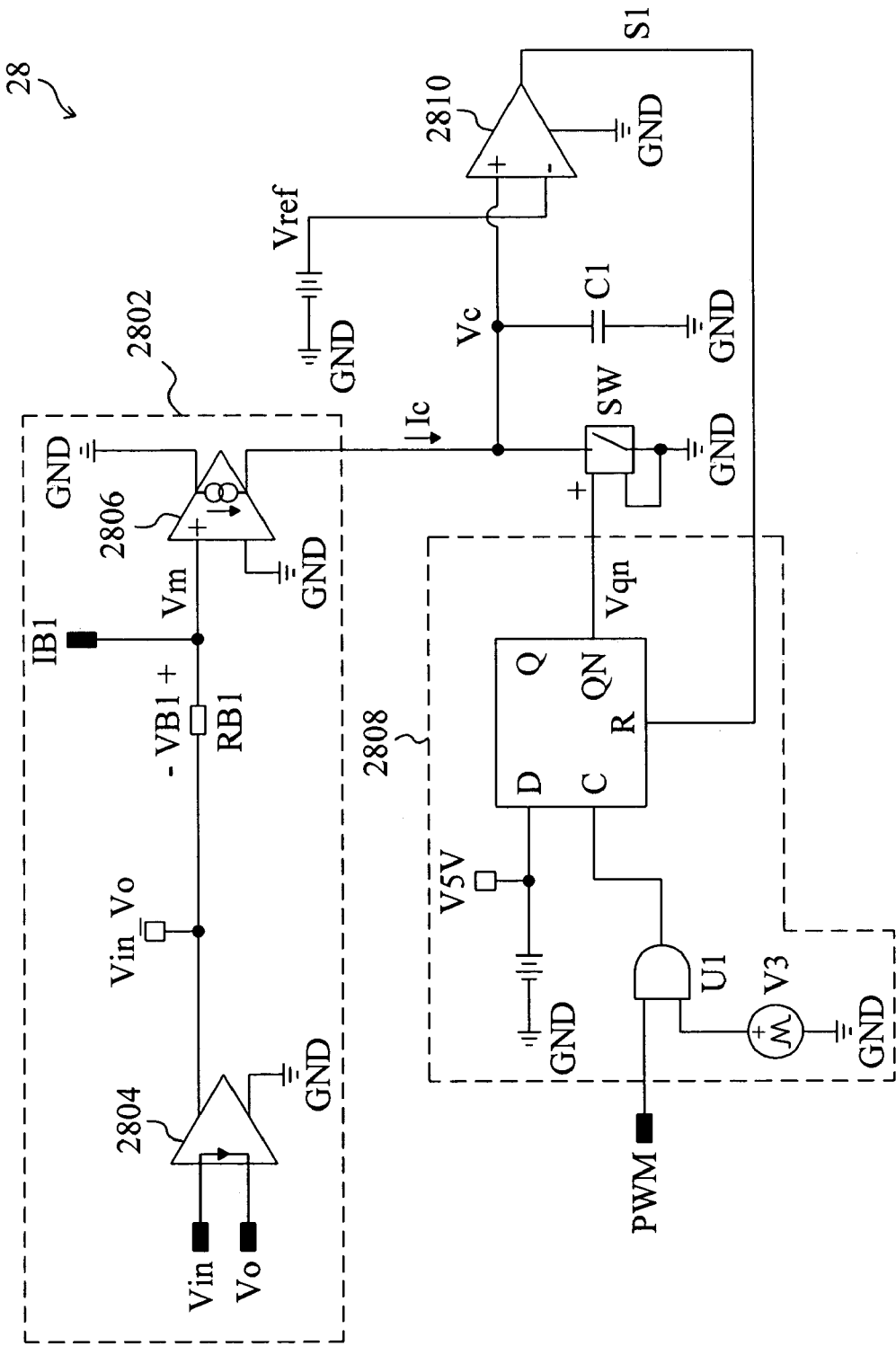
FIG. 6 is a circuit diagram of a first embodiment for the on time generator shown in FIG. 4.

FIG. 6 is a circuit diagram of a first embodiment for the on-time generator 28, in which a current source 2802 and a switch SW constitute a charging/discharging circuit to charge and discharge a capacitor C1. The current source 2802 provides a charging current Ic varying with the current error signal IB1 to charge the capacitor C1. According to the signal PWM and the control signal S1, a logic circuit 2808 generates a reset signal Vqn to turn on the switch SW to reset the capacitor C1. A comparator 2810 compares the voltage Vc on the capacitor C1 with a reference voltage Vref to generate the control signal S1. In the current source 2802, an operational amplifier 2804 generates a voltage Vin_Vo according to the difference between the input voltage Vin and the output voltage Vo to apply to one end of a resistor R, the current error signal IB1 is applied to the other end of the resistor RB1 to generate a voltage VB1 across the resistor R, and a voltage Vm is generated by combining the voltage Vin_Vo with the voltage VB1. Since the voltage VB1 varies with the current error signal IB1, the voltage Vm also varies with the current error signal IB1. A voltage-to-current converter 2806 converts the voltage Vm into the charging current Ic.

Figure 7:
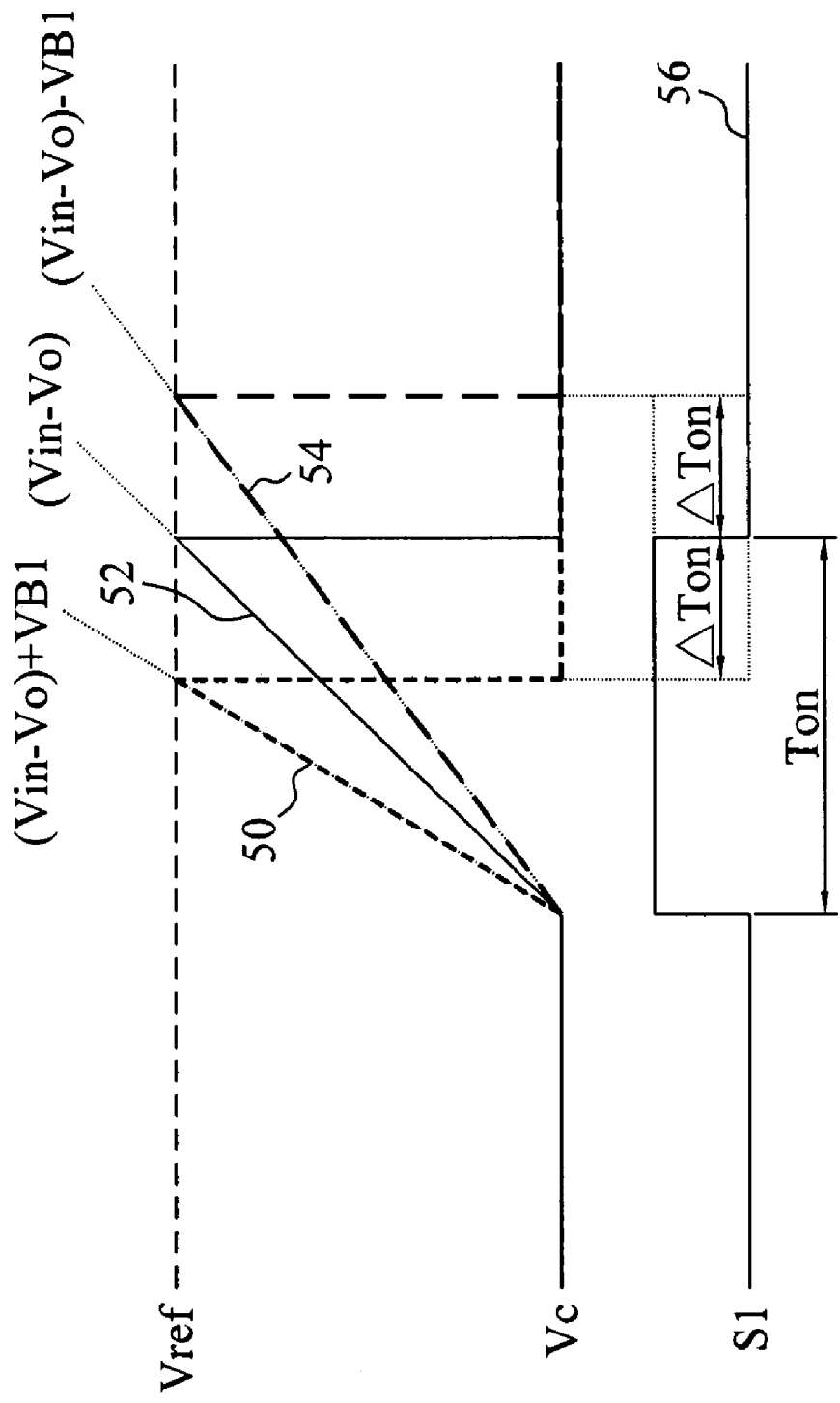
FIG. 7 is a waveform diagram of the on time generator shown in FIG. 6.

FIG. 7 is a waveform diagram of the on-time generator 28 shown in FIG. 6, in which waveforms 50, 52 and 54 represent the voltage Vc on the capacitor C1 under three different charging currents Ic, and waveform 56 represents the control signal S1. When all the channel currents IL1, IL2 and ILN are balanced, the current error signal IB1 is zero, and the voltage Vm is equal to the output (Vin-Vo) of the operational amplifier 2804. Since the input voltage Vin and the output voltage Vo are constant, the charging current Ic is also constant and therefore, the voltage Vc on the capacitor C1 has a constant rising slope as shown by the waveform 52. Accordingly, the on time Ton of the control signal S1 is also constant as shown by the waveform 56. When the channel currents IL1, IL2 and ILN are imbalanced, the current error signal IB1 is not zero. In the case that the voltage VB1 is positive, the voltage Vm is equal to [(Vin−Vo)+VB1]. Thus, the charging current Ic increases and the voltage Vc on the capacitor C1 will reach the reference voltage Vref more rapidly, as shown by the waveform 50. Consequently, the on time of the control signal S1 for modulating the channel current IL1 of the channel 22 becomes (Ton−ΔTon), which is shorter than that of the case shown by the waveform 52 and therefore the channel current IL1 will decrease to pull the current error signal IB1 toward zero. In the case that the voltage VB1 is negative due to imbalance between the channel currents IL1, IL2 and ILN, the voltage Vm will become [(Vin−Vo)−VB1]. Therefore, the charging current Ic decreases and the voltage Vc on the capacitor C1 will reach the reference voltage Vref later, as shown by the waveform 54. Thus, the on time of the control signal S1 is prolonged to (Ton+ΔTon), which will increase the channel current IL1 of the channel 22 to pull the current error signal IB1 toward zero.

Figure 8:
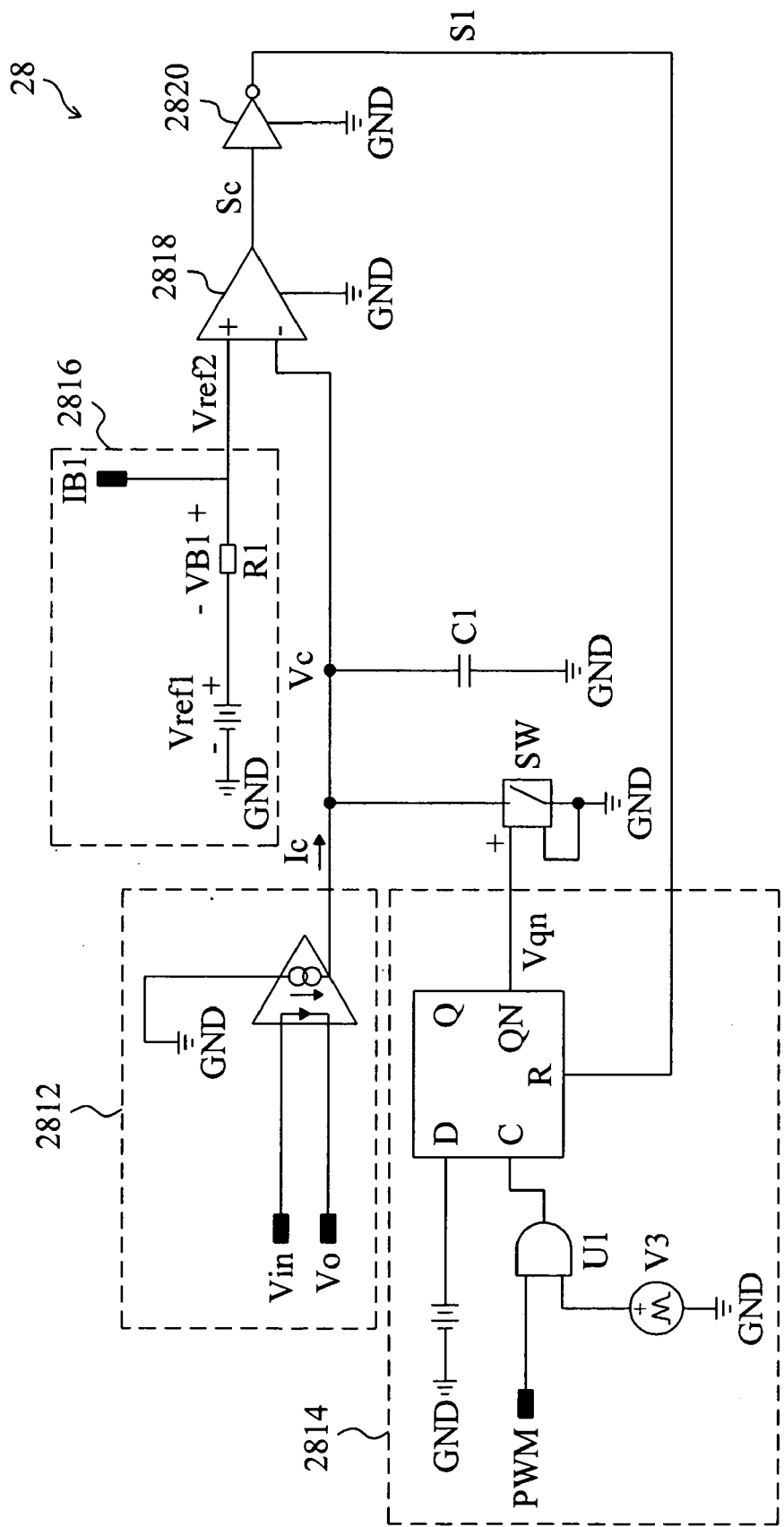
FIG. 8 is a circuit diagram of a second embodiment for the on time generator shown in FIG. 4.

FIG. 8 is a circuit diagram of a second embodiment for the on-time generator 28, in which a current source 2812 provides a constant charging current Ic to charge a capacitor C1, a logic circuit 2814 generates a reset signal Vqn according to the signal PWM and the control signal S1 to turn on the switch SW to reset the capacitor C1, a voltage source 2816 provides a voltage Vref2 varying with the current error signal IB1, a comparator 2818 compares the voltage Vref2 with the voltage Vc on the capacitor C1, and an inverter 2820 inverses the output of the comparator 2818 to generate the control signal S1. In the voltage source 2816, the current error signal IB1 is applied to a resistor R1 to generate a voltage VB1 across the resistor R1, and the reference voltage Vref1 is combined with the voltage VB1 to generate the voltage Vref2.

Figure 9:
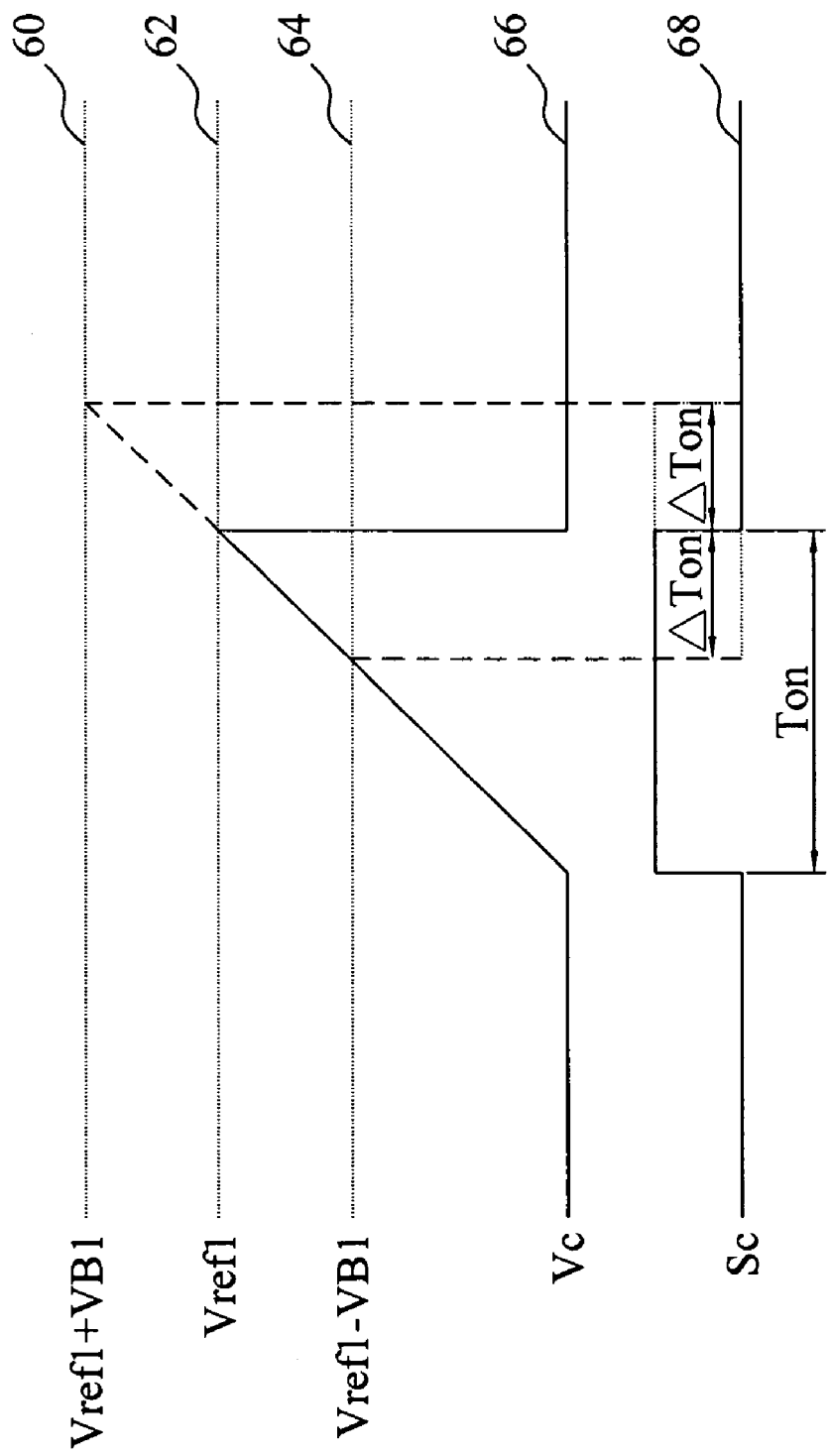
FIG. 9 is a waveform diagram of the on time generator shown in FIG. 8.

FIG. 9 is a waveform diagram of the on-time generator 28 shown in FIG. 8, in which waveform 60, 62 and 64 represent the voltage Vref2 in three cases that the voltage VB1 is positive, zero and negative, respectively, waveform 66 represents the voltage Vc on the capacitor C1, and waveform 68 represents the control signal S1. When all the channel currents IL1, IL2 and ILN are balanced, the current error signal IB1 is zero, and the voltage Vref2 is equal to the reference voltage Vref1 as shown by the waveform 62. Since the charging current Ic and the voltage Vref1 are constant, the on-time Ton of the control signal S1 is also constant as shown by the waveform 68. When the channel currents IL1, IL2 and ILN are imbalanced, the current error signal IB1 is not zero and thereby the voltage VB1 is not zero, too. If the voltage VB1 is positive, the voltage Vref2 will be (Vref1+VB1) as shown by the waveform 60 and thus, it takes a longer time for the voltage Vc to reach the voltage Vref2. Consequently, the on time of the signal Sc is prolonged to (Ton+ΔTon) and thus the on time of the control signal S1 becomes (Ton−ΔTon), thereby decreasing the channel current IL1 to pull the current error signal IB1 toward zero. If the voltage VB1 is negative due to imbalance between the channel currents IL1, IL2 and ILN, the voltage Vref2 will be (Vref1−VB1) and it needs a shorter time for the voltage Vc on the capacitor C1 to reach the voltage Vref as shown by the waveform 64. Thus, the on time of the signal Sc becomes (Ton−ΔTon), and the on time of the control signal S1 becomes (Ton+ΔTon). Consequently, the channel current IL1 of the channel 22 increases to pull the current error signal IB1 toward zero.

Figure 10:
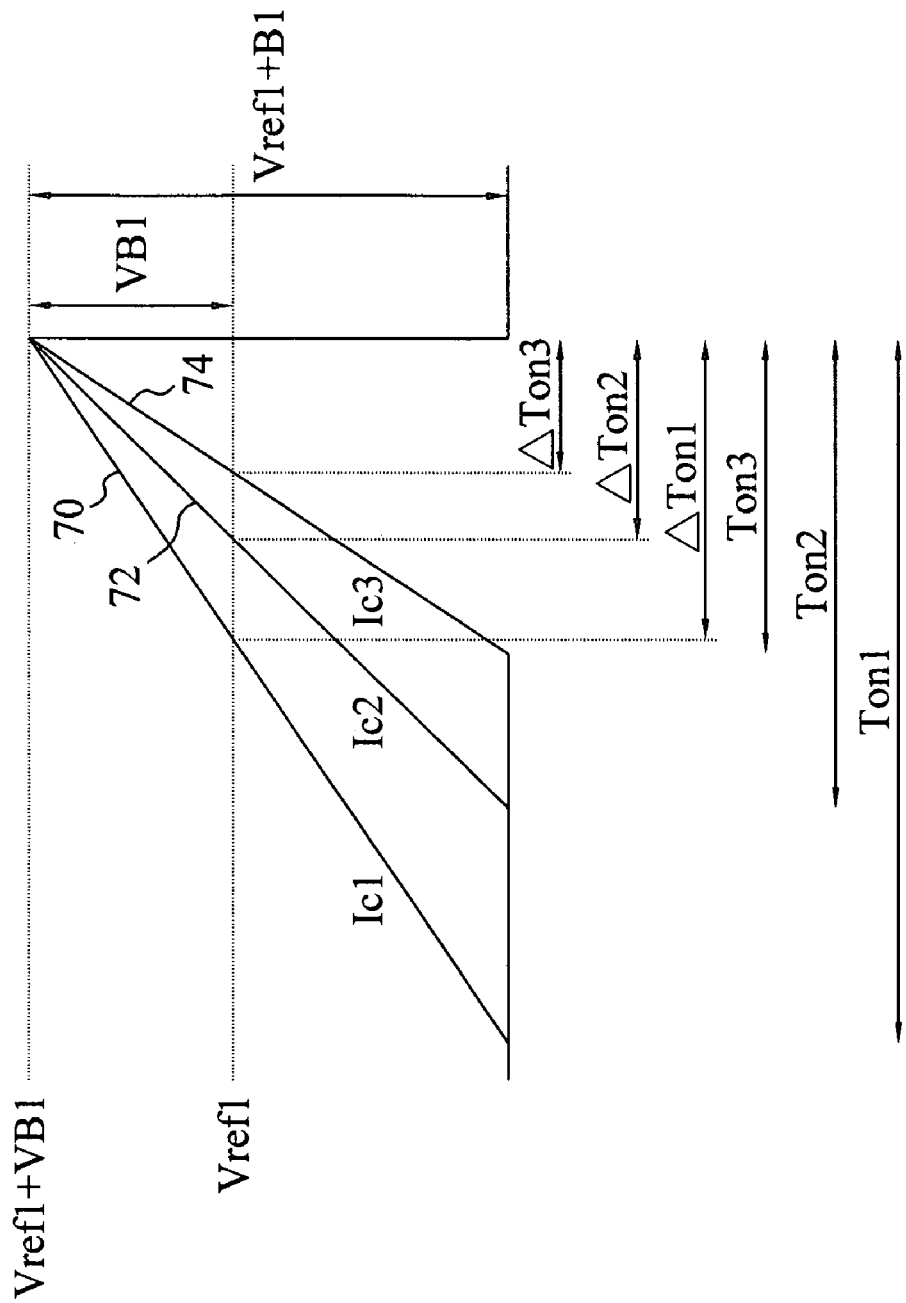
FIG. 10 is a diagram showing the on-time of the control signal of FIG. 8 and its variation under different charging currents.

FIG. 10 is a diagram showing the on-time Ton of the control signal S1 of FIG. 8 and its variation ΔTon under different values of the charging current Ic. In the circuit of FIG. 8, assuming that three different charging currents Ic1, Ic2 and Ic3 are used to charge the capacitor C1, where Ic1<Ic2<Ic3, when the voltage Vref2 increases from Vref1 to (Vref1+VB1) due to imbalanced channel currents, if the charging current Ic is Ic1, the control signal S1 will have the on-tome Ton1 and the variation ΔTon 1 of the on-time due to the imbalanced channel currents as shown by the waveform 70 in FIG. 10; if the charging current Ic is Ic2, the control signal S1 will have the on-tome Ton2 and the variation ΔTon2 of the on-time due to the imbalanced channel currents as shown by the waveform 72 in FIG. 10; and if the charging current Ic is Ic3, the control signal S1 will have the on-tome Ton3 and the variation ΔTon3 of the on-time due to the imbalanced channel currents as shown by the waveform 74 in FIG. 10. From FIG. 10 it is shown $\Delta Ton1/Ton1 = \Delta Ton2/Ton2 = \Delta Ton3/Ton3 = VB1/(*Vref+ VB1)$.

Obviously, the variation ΔTon of the on-time Ton of the control signal Si remains in proportion to the current error signal IB1 under different values of the charging current Ic.

Figure 11:
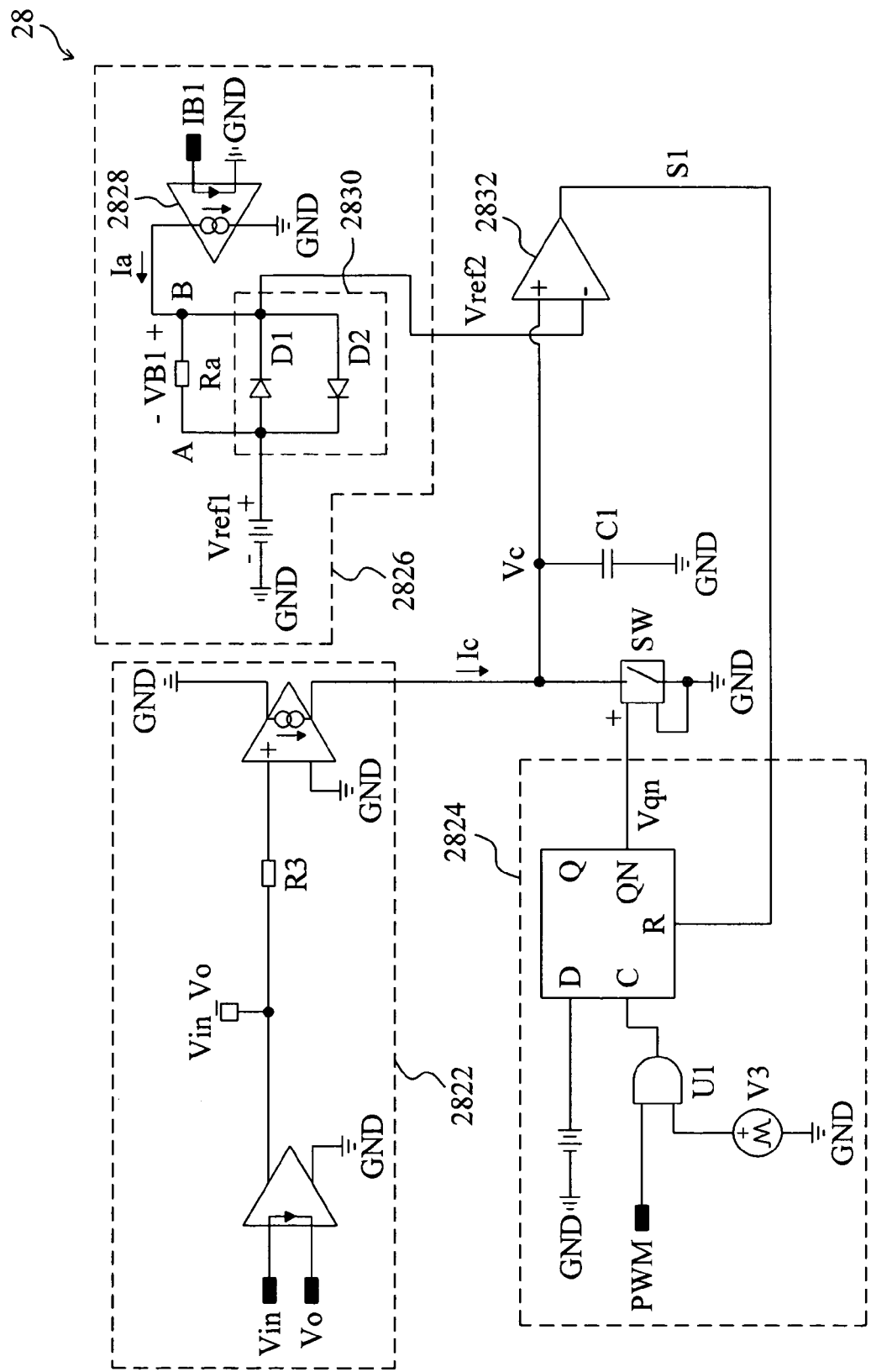
FIG. 11 is a circuit diagram of a third embodiment for the on time generator shown in FIG. 4.

When the on-times of the control signals S1 to SN of FIG. 4 excessively vary, oscillation may happen between the channels and causes the multi-phase power converter 20 abnormally operating. Therefore, it is preferred to introduce a range to clamp the variation ratio of the on-time Ton of each control signal. FIG. 11 is a circuit diagram of a third embodiment for the on-time generator 28, in which a current source 2822 provides a charging current Ic to charge a capacitor C1, a logic circuit 2824 provides a reset signal Vqn according to the signal PWM and the control signal S1 to turn on the switch SW to reset the capacitor C1, a voltage source 2826 provides a voltage Vref2 varying with the current error signal IB1, and a comparator 2832 compares the voltage Vref2 with the voltage Vc on the capacitor C1 to generate the control signal S1. In the voltage source 2826, a voltage-to-current converter 2828 converts the current error signal IB1 into a current Ia, a resistor Ra generates a voltage VB1 according to the current Ia to add to the constant reference voltage Vref1 to thereby generate a voltage Vref2, and a clamp circuit 2830 provides an upper limit and a lower limit for the voltage Vref2 to clamp the variation of the voltage Vref2. Consequently, the variation ΔTon of the on-time Ton of the control signal S1 is clamped within a certain range. In this embodiment, the clamp circuit 2830 includes a diode D1 having an anode connected to an end A of the resistor Ra and a cathode connected to the other end B of the resistor Ra, and a diode D2 having an anode connected to the end B of the resistor Ra and a cathode connected to the end A of the resistor Ra. The diodes D1 and D2 set fixed upper and lower limits for the voltage Vref2. In other words, the variation ΔTon of the on-time Ton of the control signal S1 is also clamped by fixed upper and lower limits.

Figure 12:
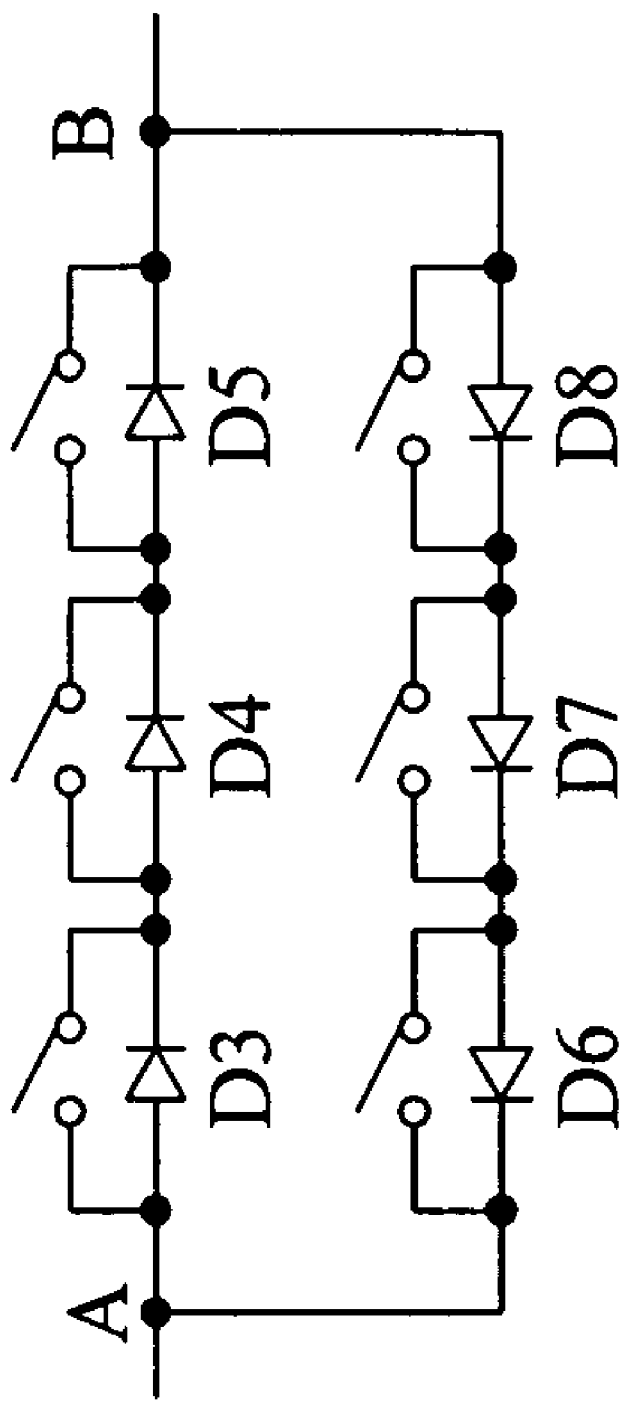
FIG. 12 is a circuit diagram of another embodiment for the clamp circuit of FIG. 11.

FIG. 12 is a circuit diagram of another embodiment for the clamp circuit 2830 of FIG. 11, in which two diode strings are connected in parallel between the ends A and B of the resistor Ra, with serially connected diodes D3, D4 and D5 between the ends A and B of the resistor Ra, and serially connected diodes D6, D7 and D8 between the ends A and B of the resistor Ra. Each the diode is shunt with a switch so that the upper and lower limits of the voltage Verf2 can be adjusted by turning on or off the switches to change the number of the diodes connected in parallel to the resistor Ra. Consequently, the upper and lower limits of the variation ΔTon of the on-time Ton of the control signal S1 are adjustable.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for current balance in a multi-phase power converter with constant on-time control, the multi-phase power converter including a plurality of channels for converting an input voltage into an output voltage, the apparatus comprising:

an error current signal generator coupled to the plurality of channels, detecting a difference between a channel current of a selected one of the plurality of channels and a target value to thereby generate a current error signal therefrom for the selected channel; and an on-time generator coupled to the error current signal generator, providing a control signal according to the current error signal to drive the selected channel;

wherein the on-time generator remains the control signal with a constant on time when the channel current of the selected channel is equal to the target value, and modulates the on time of the control signal according to the current error signal of the selected channel when the channel current of the selected channel is not equal to the target value.

2. The apparatus of claim 1, wherein the error current signal generator comprises:

an adder coupled to the plurality of channels, summing all channel currents of the plurality of channels to thereby generate a summed current;

a divider coupled to the adder, dividing the summed current by the number of the plurality of the channels to thereby generate the target value; and a subtractor coupled to the divider and the selected channel, subtracting the target value from the channel current of the selected channel to thereby generate the current error signal for the selected channel.

3. The apparatus of claim 1, wherein the on-time generator comprises:

a capacitor;

a charging/discharging circuit coupled to the capacitor, charging and discharging the capacitor to thereby generate a voltage on the capacitor; and a comparator coupled to the capacitor, comparing the voltage on the capacitor with a reference voltage to thereby generate the control signal.

4. The apparatus of claim 3, wherein the charging/ discharging circuit comprises:

a current source coupled to the capacitor, providing a charging current varying with the current error signal for the selected channel to charge the capacitor; and a switch shunt to the capacitor, discharging the capacitor under control of a reset signal.

5. The apparatus of claim 1, wherein the on time of the control signal has a variation clamped between an upper limit and a lower limit when the channel current of the selected channel is not equal to the target value.

6. The apparatus of claim 5, wherein the upper limit and the lower limit for the variation of the on time of the control signal are adjustable.

7. An apparatus for current balance in a multi-phase power converter with constant on-time control, the multi-phase power converter including a plurality of channels for converting an input voltage into an output voltage, the apparatus comprising:

an error current signal generator coupled to the plurality of channels, detecting a difference between a channel current of a selected one of the plurality of channels and a target value to thereby generate a current error signal therefrom for the selected channel; and an on-time generator coupled to the error current signal generator, providing a control signal according to the current error signal to drive the selected channel;

wherein the on-time generator remains the control signal with a constant on time when the channel current of the selected channel is equal to the target value, and modulates the on time of the control signal according to the current error signal of the selected channel when the channel current of the selected channel is not equal to the target value;

wherein the on-time generator comprises:

a capacitor;

a current source coupled to the capacitor, providing a constant charging current to charge the capacitor;

a switch shunt to the capacitor, discharging the capacitor under control of a reset signal;

a voltage source coupled to the error current signal generator, providing a first voltage varying with the current error signal for the selected channel; and a comparator coupled to the voltage source and the capacitor, comparing the first voltage with a second voltage on the capacitor to thereby generate the control signal.

8. The apparatus of claim 7, further comprising a clamp circuit coupled to the voltage source, providing an upper limit and a lower limit for the first voltage.

9. The apparatus of claim 8, wherein the upper limit and the lower limit for the first voltage are adjustable.

10. A method for current balance in a multi-phase power converter with constant on-time control, the multi-phase power converter including a plurality of channels for converting an input voltage into an output voltage, the method comprising:

for a selected one of the plurality of channel, generating a current error signal from a difference between a channel current of the selected channel and a target value; and generating a control signal according to the current error signal to drive the selected channel, wherein the control signal has a constant on time when the channel current of the selected channel is equal to the target value, and a modulated on time varying with the current error signal for the selected channel when the channel current of the selected channel is not equal to the target value.

11. The method of claim 10, further comprising averaging all channel currents of the plurality of channels to generate the target value.

12. The method of claim 10, wherein the step of generating a control signal comprises:

providing a charging current varying with the current error signal for the selected channel to charge a capacitor; and comparing a voltage on the capacitor with a reference voltage to thereby generate the control signal.

13. The method of claim 10, further comprising providing an upper limit and a lower limit for a variation of the on time of the control signal.

14. The method of claim 13, wherein the upper limit and the lower limit are adjustable.

15. A method for current balance in a multi-phase power converter with constant on-time control, the multi-phase power converter including a plurality of channels for converting an input voltage into an output voltage, the method comprising:

for a selected one of the plurality of channel, generating a current error signal from a difference between a channel current of the selected channel and a target value; and generating a control signal according to the current error signal to drive the selected channel, wherein the control signal has a constant on time when the channel current of the selected channel is equal to the target value, and a modulated on time varying with the current error signal for the selected channel when the channel current of the selected channel is not equal to the target value;

wherein the step of generating a control signal comprises:

providing a constant charging current to charge a capacitor; and comparing a first voltage varying with the current error signal for the selected channel with a second voltage on the capacitor to thereby generate the control signal.

16. The method of claim 15, further comprising providing an upper limit and a lower limit for the first voltage.

17. The method of claim 16, wherein the upper limit and the lower limit for the first voltage are adjustable.

* * * * *